United States Patent
Moudgill

(10) Patent No.: US 7,895,413 B2
(45) Date of Patent: *Feb. 22, 2011

(54) MICROPROCESSOR INCLUDING REGISTER RENAMING UNIT FOR RENAMING TARGET REGISTERS IN AN INSTRUCTION WITH PHYSICAL REGISTERS IN A REGISTER SUB-FILE

(75) Inventor: Mayan Moudgill, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 87 days.

This patent is subject to a terminal disclaimer.

(21) Appl. No.: 12/121,564

(22) Filed: May 15, 2008

(65) Prior Publication Data

US 2008/0209166 A1    Aug. 28, 2008

Related U.S. Application Data

(63) Continuation of application No. 11/511,677, filed on Aug. 29, 2006, now abandoned, which is a continuation of application No. 10/087,880, filed on Mar. 4, 2002, now Pat. No. 7,120,780.

(51) Int. Cl.
*G06F 15/76*    (2006.01)
(52) U.S. Cl. .......................................... 712/28; 712/24
(58) Field of Classification Search .................... 712/28
See application file for complete search history.

(56) References Cited

U.S. PATENT DOCUMENTS

| | | | | |
|---|---|---|---|---|
| 5,966,544 A | * | 10/1999 | Sager | 712/32 |
| 6,167,503 A | * | 12/2000 | Jouppi | 712/23 |
| 6,230,180 B1 | * | 5/2001 | Mohamed | 708/523 |
| 6,301,653 B1 | * | 10/2001 | Mohamed et al. | 712/214 |
| 7,028,161 B2 | * | 4/2006 | Nguyen et al. | 712/23 |
| 7,120,780 B2 | * | 10/2006 | Moudgill | 712/24 |

* cited by examiner

*Primary Examiner*—Chun-Kuan Lee
*Assistant Examiner*—Brooke J Dews
(74) *Attorney, Agent, or Firm*—F. Chau & Associates, LLC

(57) ABSTRACT

A microprocessor for processing instructions comprises multiple clusters for receiving the instructions, each of the clusters having a plurality of functional units for executing the instructions, multiple register sub-files each having multiple registers for storing data for executing the instructions, wherein each of the clusters is associated with corresponding one of the register sub-files so that an instruction dispatched to a cluster is executed by accessing registers in a register sub-file associated with the cluster to which the instruction is dispatched, a register-renaming unit for renaming target registers in an instruction with registers in a register sub-file associated with a cluster to which the instruction is dispatched, and issue-queue units each of which is associated with a corresponding one of the clusters, wherein an issue-queue unit holds instruction renamed by the register-renaming unit until the renamed instruction is issued to be executed in a cluster associated with the issue-queue unit.

5 Claims, 5 Drawing Sheets

MICROPROCESSOR INCLUDING REGISTER RENAMING UNIT FOR RENAMING TARGET REGISTERS IN AN INSTRUCTION WITH PHYSICAL REGISTERS IN A REGISTER SUB-FILE

CROSS REFERENCE TO RELATED UNITED STATES APPLICATIONS

This application is a continuation of, and claims priority from, U.S. patent application Ser. No. 11/511,677, filed on Aug. 29, 2006, now abandoned which is a continuation of, and claims priority from, U.S. patent application Ser. No. 10/087,880, filed on Mar. 4, 2002 of Mayan Moudgill, now U.S. Pat. No. 7,120,780 the contents of which are incorporated herein in their entirety.

BACKGROUND OF THE INVENTION

1. Field of the Invention

The present invention relates to functional units and registers to process data in a microprocessor, and more particularly, to a microprocessor with clusters and register files which are associated with each other to enhance the efficiency of data process therein.

2. Description of the Related Art

A microprocessor in an electronic system generally contains multiple functional units and multiple registers for the use of data process therein. Each functional unit executes instructions to write data into pertinent register(s) in a register file. Functional units may be any data computation units such as an arithmetic logic unit (ALU), an adder unit, a floating point unit, a load store unit, etc.

Since functional units in a microprocessor dispatch data to a register file in the same cycle, a register file should have the same number of write ports as that of the functional units to satisfy the "peak data write requirement", in which all the functional units generate data to be written into a register file in the same cycle. Thus, as the number of functional units in a microprocessor is increased, the number of write ports of a register file should be increased to satisfy the peak data write requirement.

Increase in the number of ports in a register file causes increase in the area required to implement the register file and also in the time required to access data in the register file. For example, in a data write mode, the number of write ports in a register file determines the number of data values (or, the amount of data) that can be simultaneously written into the register file.

Referring to FIG. 1, there is provided a block diagram illustrating a register file and functional units in a typical microprocessor. The microprocessor 10 may have "n" functional units $FU_1$-$FU_n$ each of which can simultaneously produce data every cycle. In this case, to satisfy the peak data write requirement, the microprocessor 10 should have a register file 12 with the same number of write ports $WP_1$-$WP_n$ as that of the functional units $FU_1$-$FU_n$, i.e., "n" write ports.

In case that it is required for a microprocessor to have more functional units, it is also required to increase the number of write ports of a register file in the microprocessor. Such an increase in the number of write ports affects size and speed of the microprocessor.

To overcome such problems in the conventional microprocessors, a register file in a microprocessor is designed to have fewer number of write ports than the number of functional units. In such processors, it is necessary to arbitrate the functional units for the write ports of the register file. In other words, an arbitration unit is required to manage data communication between the functional units and the write ports of a register file.

In an arbitration process, a functional unit should first send a request signal to an arbitration unit to write data into a register file. The arbitration unit receives all request signals from functional units and then grants certain functional units access to the write ports in accordance with an arbitration logic. Then, the functional units of which requests have been granted may proceed to write data into a register file, and other functional units of which requests have not been granted should request the access in the next cycle.

In a microprocessor adopting the arbitration technique, since each functional unit should send an access request and wait for the grant, it causes additional delay in data process of the microprocessor. For example, a cycle time for the microprocessor may be increased by a time period required for the arbitration process. Also, the arbitration process may affect performance of the microprocessor by forcing the functional units stall if there is no write port free.

Another example of a conventional approach in this area can be found in "The Multi-cluster Architecture: Reducing Cycle Time Through Partitioning" by K. I. Frakas et al., pp. 149-159, MICRO-30, December 1997. In this reference, architected registers are partitioned for the purpose of decoupling clusters and reducing read and write ports of a register file. In this technique, data read and write operation can be performed only between particular register files and functional units associated with each other. This technique is described below with reference to FIG. 2.

In FIG. 2, the first and second functional units $FU_1$, $FU_2$ are associated with the first and second register files $RF_1$, $RF_2$, respectively. The first register file $RF_1$ has architected registers $r_0$-$r_{15}$, and the second register file $RF_2$ has architected registers $r_{16}$-$r_{31}$. The first functional unit $FU_1$ has efficient access to the architected registers $r_0$-$r_{15}$ in the first register file $RF_1$, and the second functional unit $FU_2$ has efficient access to the architected registers $r_{16}$-$r_{31}$ in the second register file $RF_2$. For example, the efficient access may be accomplished when instruction "$r_7 \leftarrow r_{11} + r_{12}$" is dispatched to the first functional unit $FU_1$, and instruction "$r_{17} \leftarrow r_{23} + r_{31}$" is dispatched to the second functional unit $FU_2$.

However, this technique has drawbacks in case of instructions such as instruction "$r_7 \leftarrow r_{11} + r_{31}$" which is dispatched to the first functional unit $FU_1$. In this case, to obtain the contents of the architected register $r_{31}$, the first functional unit $FU_1$ should have access to the second register file $RF_2$. The access path between the first functional unit $FU_1$ and the second register file $RF_2$ is so slow that performance of the microprocessor may be severely retarded.

Another problem in the microprocessor in FIG. 2 is that computation of the microprocessor may be distributed unevenly. In other words, if the program being executed in the microprocessor uses mostly architected registers $r_0$-$r_{15}$ of the first register file $RF_1$, the computation for the program is not evenly distributed and the registers $r_{16}$-$r_{31}$ in the second register file $RF_2$ are not utilized.

Therefore, a need exists for a microprocessor having less number of write ports in a register file than the number of functional units, while having no problems such as performance delay or degradation caused by the arbitration process, data access through the slow paths, the uneven distribution of computation, etc.

OBJECTS AND SUMMARY OF THE INVENTION

It is an object of the present invention to provide a microprocessor having less number of write ports in a register file than the number of functional units in the microprocessor.

It is another object of the present invention to provide a method of designing a microprocessor with register files and functional units which satisfy the "peak data write requirement", while the register files have less number of write ports than the number of functional units.

To accomplish the above and other objects of the present invention, there is provided a microprocessor for processing instructions, comprising a plurality of clusters for receiving the instructions, each of the clusters having a plurality of functional units for executing the instructions; and a plurality of register sub-files each having a plurality of registers for storing data for executing the instructions, wherein each of the clusters is associated with corresponding one of the register sub-files so that an instruction dispatched to a cluster is executed by accessing registers in a register sub-file associated with the cluster to which the instruction is dispatched. Each of the register sub-files preferably has one write port to which a corresponding cluster sends data to be written into registers in a register sub-file associated with the corresponding cluster, and the register sub-files each have a same number of registers.

The microprocessor may also include a register-renaming unit for renaming target registers in an instruction with registers in a register sub-file associated with a cluster to which the instruction is dispatched. The register-renaming unit identifies a register to be used to store a value named by a target register in the instruction. The microprocessor may also include issue-queue units each of which is associated with a corresponding one of the clusters and an instruction dispatch mechanism for determining which of the clusters each instruction is dispatched to. An issue-queue unit holds instruction renamed by the register-renaming unit until the renamed instruction is issued to be executed in a cluster associated with the issue-queue unit, and the instruction dispatch mechanism controls the issue-queue units to determine which of the instructions need to be executed.

In another aspect of the present invention, a system is provided for processing an instruction in a microprocessor. The system comprises at least one cluster having at least one functional unit for executing the instruction; and at least one register file having a predetermined number of physical registers to and from which data is write and read in accordance with the instruction, wherein the at least one register file has one write port to which an output of the at least one cluster is connected, and data write operation in accordance with the instruction executed by the at least one functional unit is performed by accessing the physical registers of the at least one register file.

The system may also include means for renaming architected registers of the instruction with the physical registers of the at least one register file, and at least one issue-queue unit associated with the at least one cluster, for holding instruction renamed by the means for renaming until the instruction is issued to be executed in the at least one cluster.

In another aspect of the present invention, a method is provided for processing instructions in a microprocessor. The method comprises the steps of providing clusters each having functional units for executing the instructions; dividing a register file into a plurality of register sub-files each having registers to store data for executing the instructions; associating each of the register sub-files with corresponding one of the clusters; selecting a cluster to which an instruction is dispatched; renaming target registers in the instruction with registers in a register sub-file associated with the selected cluster; and dispatching the instruction to the selected cluster wherein the instruction is executed by functional units. The dividing step may also include assigning a same number of registers to each of the register sub-files. The associating step may include providing one write port for each of the register sub-files so that a cluster associated with a register sub-file sends data to be written to a write port of the register sub-file. The renaming step may include identifying a register in a register sub-file to be used to store value named by a target register in the instruction.

These and other objects, features and advantages of the present invention will become apparent from the following detailed description of illustrative embodiments thereof, which is to be read in connection with the accompanying drawings.

DESCRIPTION OF PREFERRED EMBODIMENTS

Detailed illustrative embodiments of the present invention are disclosed herein. However, specific structural and functional details disclosed herein are merely representative for purposes of describing preferred embodiments of the present invention.

Figure 1:
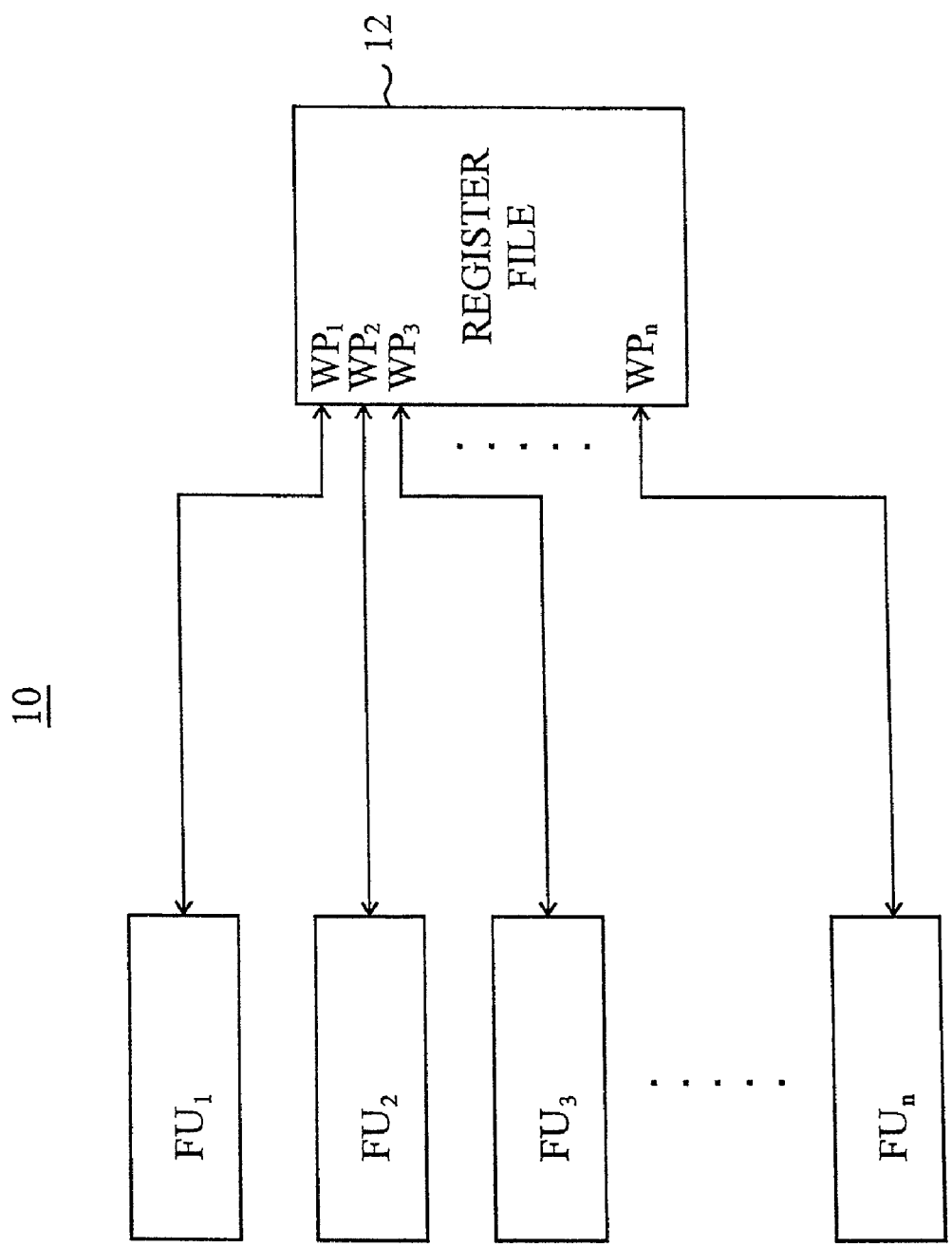
FIG. 1 is a block diagram illustrating a register file and functional units in a conventional microprocessor.
Figure 2:
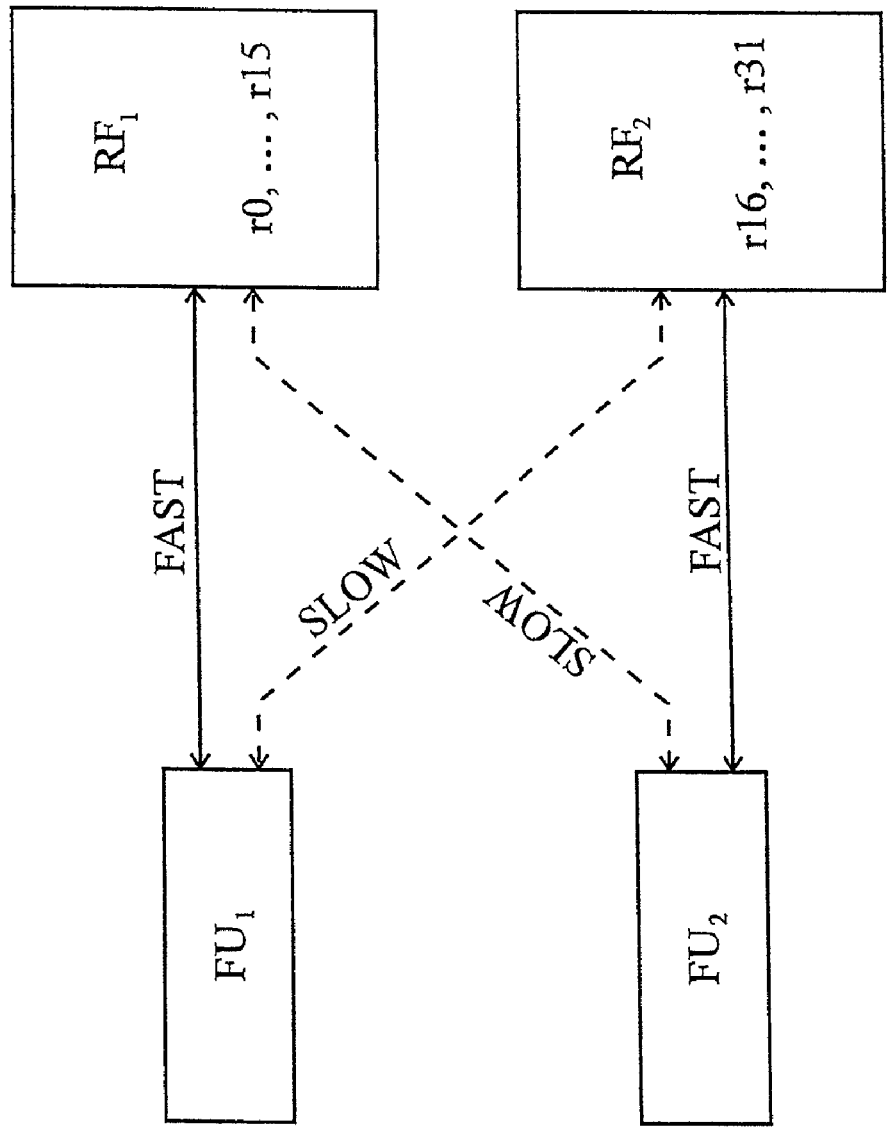
FIG. 2 is a block diagram illustrating register files and functional units in another conventional microprocessor.
Figure 3:
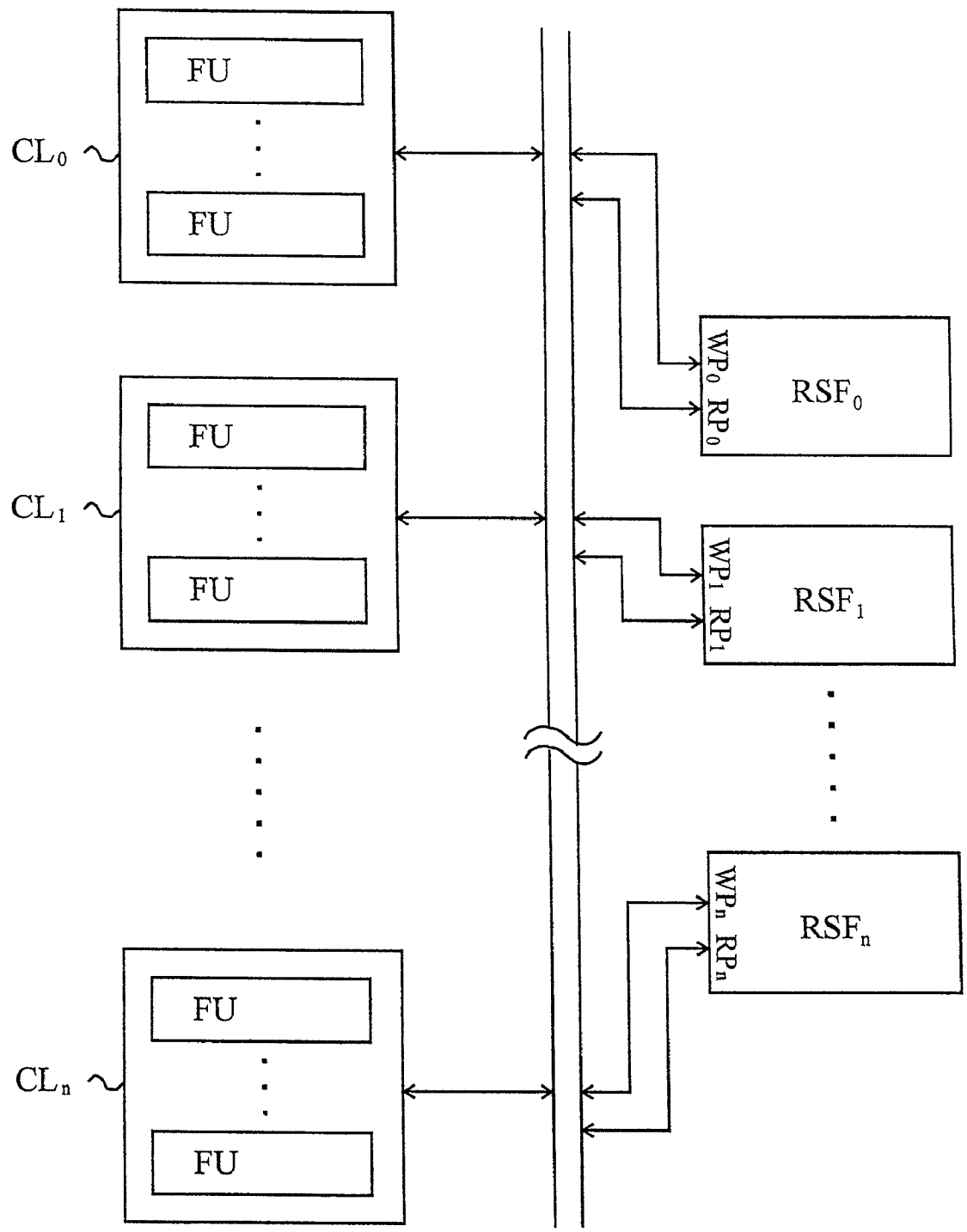
FIG. 3 is a block diagram illustrating register sub-files and clusters in a microprocessor according to a preferred embodiment of the present invention.

Referring to FIG. 3, a block diagram is provided for illustrating a microprocessor according to a preferred embodiment of the present invention. In the microprocessor 30, a register file is divided into multiple register sub-files $RSF_0$-$RSF_n$. Each of the register sub-files $RSF_0$-$RSF_n$ includes a set of physical registers (refer to FIG. 4). Preferably, the register sub-files $RSF_0$-$RSF_n$ each have the same size, i.e., the same number of physical registers, and have one write port $WP_0$-$WP_n$, respectively, through which data is written into registers in a corresponding register sub-file. Each register sub-file also has at least one read port $RP_0$-$RP_n$ through which data is read from registers in a corresponding register sub-file.

The microprocessor 30 also has multiple clusters $CL_0$-$CL_n$ each of which includes a set of functional units. Each register sub-file is associated with corresponding one of the clusters. In the microprocessor 30, the clusters $CL_0$-$CL_n$ are functionally and/or structurally associated with the register sub-files $RSF_0$-$RSF_n$, respectively.

In this embodiment, a cluster sends data only to a register sub-file associated with the cluster in a data write operation, while a cluster can read data from any of the register sub-files $RSF_0$-$RSF_n$ in a data read operation. For example, when a write instruction is dispatched to cluster $CL_0$ to be executed by the functional unit(s) therein, only register(s) in register sub-file $RSF_0$ associated with the cluster $CL_0$ may be accessed to write data therein. Thus, it is not necessary for each register sub-file to support write instructions issued from all the clusters $CL_0$-$CL_n$. Instead, each register sub-file only needs to support write instructions from the functional units within a cluster associated with the register sub-file.

Figure 4:
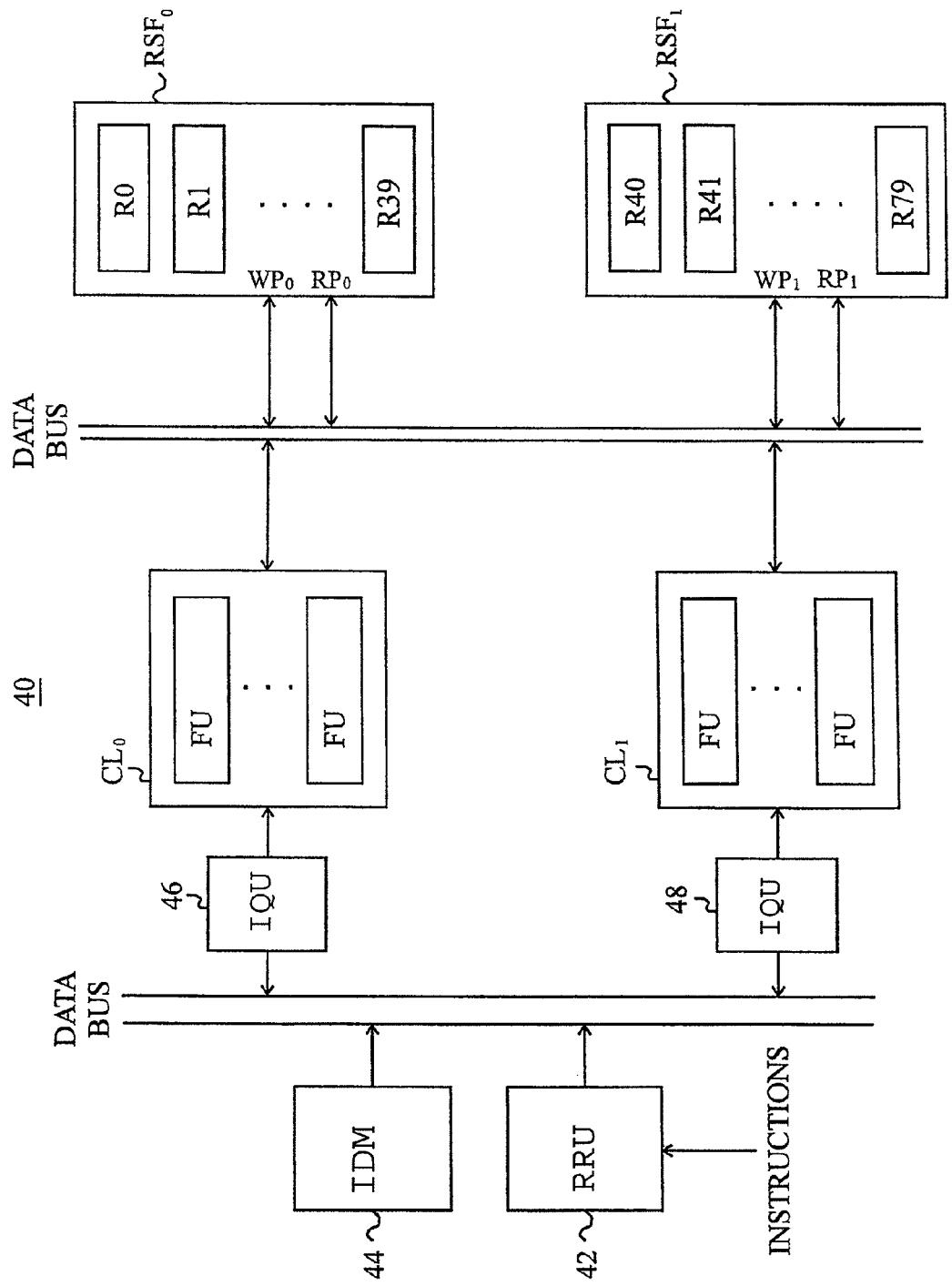
FIG. 4 is a block diagram for illustrating a microprocessor according to another embodiment of the present invention.

Referring to FIG. 4, it is assumed for a convenience of the description that a microprocessor 40 has two (2) clusters $CL_0$, $CL_1$ and two (2) register sub-files $RSF_0$, $RSF_1$. The first and second clusters $CL_0$, $CL_1$ are functionally and structurally associated with the first and second register sub-files $RSF_0$, $RSF_1$, respectively. The first and second clusters $CL_0$, $CL_1$ each have multiple functional units each generating one output result per cycle. The first and second register sub-files $RSF_0$, $RSF_1$ each have multiple physical registers. For example, the first register sub-file $RSF_0$ has physical registers $R_0$-$R_{39}$, and the second register sub-file $RSF_1$ has physical registers $R_{40}$-$R_{79}$.

The first and second register sub-files $RSF_0$, $RSF_1$ also have write ports $WP_0$, $WP_1$, respectively. Thus, the first cluster $CL_0$ (or functional units in the first cluster) accesses the registers in the first register sub-file $RSF_0$ to write data in the registers therein, and the second cluster $CL_1$ (or functional units in the second cluster) accesses the registers in the second register sub-file $RSF_1$ to write data in the registers therein. Since each cluster is associated with the corresponding register sub-file, the microprocessor 40 with register sub-files each having only one write port satisfies the peak data write requirement in a data write operation.

In the microprocessor 40, a register-renaming unit (RRU) 42 is also provided for performing register-renaming process with respect to instructions to be transferred to the clusters $CL_0$, $CL_1$ which are then executed by the functional units therein. It should be noted that the register-renaming unit (RRU) 42 may be configured outside the microprocessor 40, and that the register-renaming process may be implemented by use of software program without any separate hardware structure.

In the register-renaming unit (RRU) 42, architected registers in an instruction are mapped into physical registers in the register sub-files $RSF_0$, $RSF_1$. Architected registers are used to identify values associated with computation of a microprocessor. For example, in instructions "$r_3 \leftarrow$ add $r_7$, $r_9$" and "$r_3 \leftarrow$ mul $r_3$, $r_2$", register $r_3$ is an architected register. Register $r_3$ first contains the result of the addition which is then used as an input to the multiply. The result of the multiply is then stored in register $r_3$. Generally, there are fixed number of architected registers for a particular instruction set architecture (ISA). For example, the PowerPC ISA has thirty-two (32) general purpose architected registers.

Physical registers in the register sub-files $RSF_0$, $RSF_1$ are hardware realization of the architected registers. For a microprocessor, there can be more physical registers than architected registers. Thus, values named by a specific architected register may reside in different physical registers. For example, in the above instructions "$r_3 \leftarrow$ add $r_7$, $r_9$" and "$r_3 \leftarrow$ mul $r_3$, $r_2$", the result of the addition may be placed in physical register $R_{54}$. Then, when the multiply is executed, the physical register $R_{54}$ is read to obtain its content and the result of the multiply may be placed in physical register $R_{20}$.

In a register-renaming process, each architected register is mapped into corresponding one of the physical registers. In the above example, architected register $r_3$ may be mapped into physical register $R_{54}$ or $R_{20}$.

Preferably, in the register-renaming process, target registers in an instruction are renamed with physical registers in the register sub-files $RSF_0$, $RSF_1$. In other words, the renaming is to identify a physical register in a register sub-file that will be used to store value named by a target register in an instruction. A target register is an architected register in an instruction that will be provided with a result of the instruction. For example, in the instruction "$r_3 \leftarrow$ add $r_7$, $r_9$", register $r_3$ is a target register.

Prior to the register-renaming process, it is necessary to determine which of the clusters each instruction is dispatched to. Such determination may be performed in a instruction dispatch mechanism (IDM) 44. Once an instruction is determined to be dispatched to a particular cluster, target registers in the instruction are renamed with physical registers in a register sub-file which is functionally associated with the particular cluster. For example, when an instruction is determined to be dispatched to the first cluster $CL_0$ to be executed by the functional units therein, target registers of the instruction are renamed with the physical registers in the first register sub-file $RSF_0$, i.e., registers $R_0$-$R_{39}$.

The microprocessor 40 may also include issue-queue units (IQU) 46, 48 which are functionally associated with the register sub-files $RSF_0$, $RSF_1$, respectively. The issue-queue units (IQU) 46, 48 hold the state identifying which of the instructions needs to be executed. Thus, in the issue-queue units, register-renamed instructions (i.e., instructions after the register-renaming process) are held until they are issued to be executed by functional units in an appropriate register sub-file. The instruction dispatch mechanism (IDM) 44 also determines which of the issue-queue units each instruction is transferred to.

Figure 5:
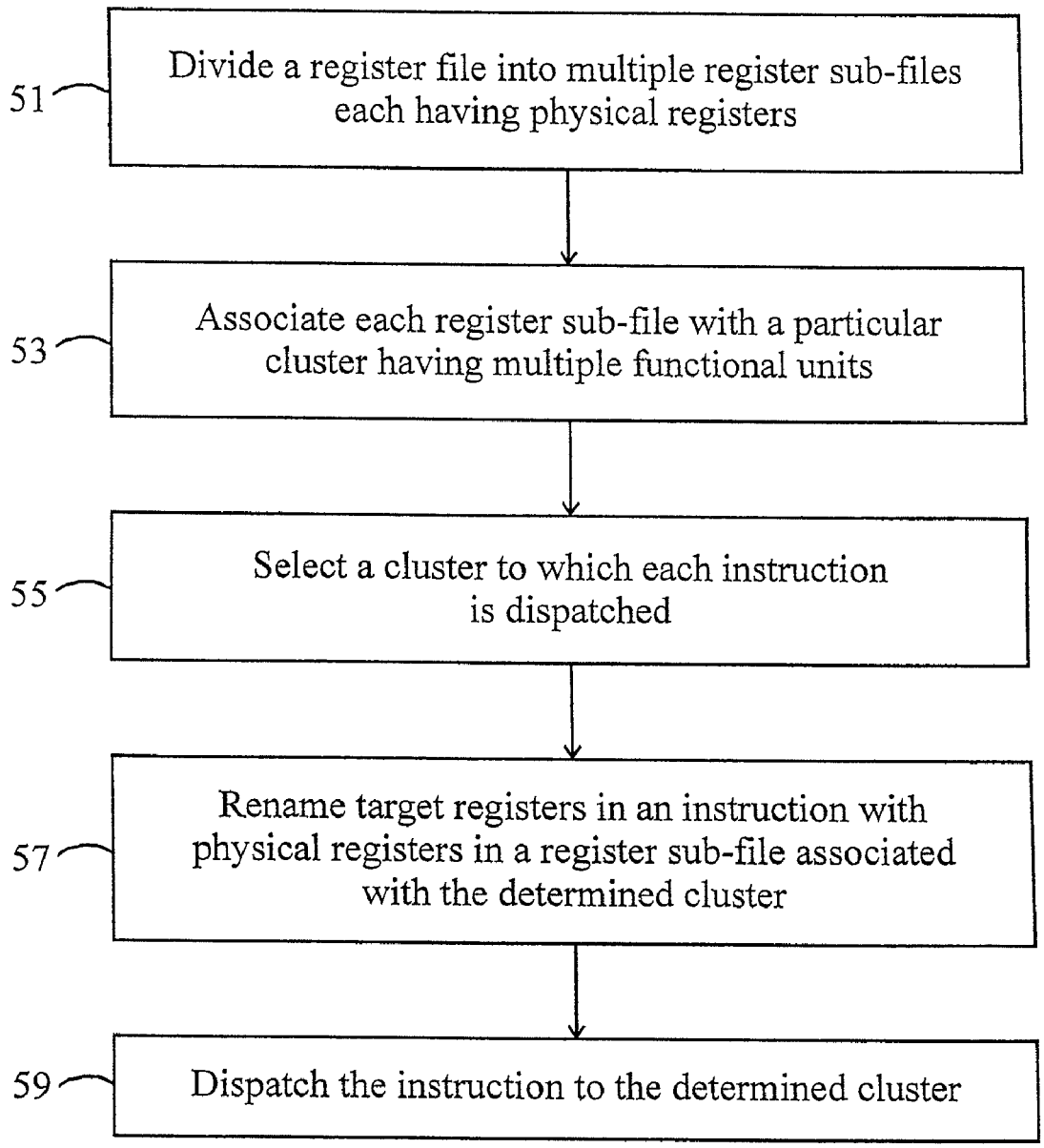
FIG. 5 is a flow chart for describing operation of the microprocessor in FIG. 4.

In FIG. 5, a flow chart is provided for describing the method of register-renaming according to the present invention. In a microprocessor with a register file having multiple physical registers, the register file is divided into multiple register sub-files (step 51). As a result, each of the register sub-files has a predetermined number of physical registers and preferably one write port. The physical registers may be grouped evenly so that the register sub-files each have the same number of physical registers.

Each of the register sub-files is associated with a particular cluster having multiple functional units for executing instructions (step 53). A register sub-file is functionally associated with a corresponding cluster so that instructions dispatched to the cluster are supported by physical registers in the register sub-file associated with the corresponding cluster. Then, it is determined which of the clusters each instruction is dispatched to (step 55). Each instruction is dispatched to a selected cluster to be executed by functional units in that cluster.

The register-renaming process is performed with respect to the instructions, where architected registers (preferably, target registers) in an instruction are renamed with physical registers in the register sub-files (step 57). For example, when an instruction is determined to be dispatched to a cluster, target registers in the instruction are renamed with physical registers in a register sub-file associated with the cluster.

In consummation of the register-renaming process, each instruction is dispatched to a corresponding cluster determined in step 55 (step 59). Thus, the instruction is executed by functional units in the cluster. For the execution of the instruction, only the physical registers in a register sub-file associated with the cluster are accessed to store data from the cluster.

Having described preferred embodiments of a system and method of register-renaming in a microprocessor according to the present invention, modifications and variations can be readily made by those skilled in the art in light of the above teachings. It is therefore to be understood that, within the scope of the appended claims, the present invention can be practiced in a manner other than as specifically described herein.

What is claimed is:

1. A system for processing an instruction in a microprocessor, comprising:
    a plurality of clusters having at least one functional unit for executing the instruction; and
    a plurality of register files having a predetermined number of physical registers to and from which data is write and read in accordance with the instruction, wherein there is a one-to-one correspondence between register files and clusters wherein each pair of a register file and a cluster are associated with each other,
    wherein each of the register files has only one write port to which an output of the corresponding cluster is connected, and data write operation in accordance with the instruction executed by the at least one functional unit is performed by accessing the physical registers of the at least one register file, and wherein each of the plurality of register files has at least one read port from which any of the plurality of clusters can read data.

2. The system of claim 1, wherein each of the plurality of clusters includes multiple functional units each for executing different instructions.

3. The system of claim 1, further including means for renaming architected registers of the instruction with the physical registers of each of the plurality of register files.

4. The system of claim 3, wherein the architected registers are target registers in which a result of the instruction is stored.

5. The system of claim 3, further including at least one issue-queue unit associated with the plurality of clusters, for holding instruction renamed by the means for renaming until the instruction is issued to be executed in one of the plurality of clusters.

* * * * *